United States Patent
Sato et al.

(10) Patent No.: US 11,267,357 B2
(45) Date of Patent: Mar. 8, 2022

(54) CHARGING SYSTEM

(71) Applicant: TOYOTA JIDOSHA KABUSHIKI KAISHA, Toyota (JP)

(72) Inventors: Masaaki Sato, Susono (JP); Satoshi Kondo, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 196 days.

(21) Appl. No.: 16/661,489

(22) Filed: Oct. 23, 2019

(65) Prior Publication Data
US 2020/0139836 A1 May 7, 2020

(30) Foreign Application Priority Data
Nov. 2, 2018 (JP) .............................. JP2018-207552

(51) Int. Cl.
*B60L 53/35* (2019.01)
*B60L 53/16* (2019.01)

(52) U.S. Cl.
CPC ............... *B60L 53/35* (2019.02); *B60L 53/16* (2019.02)

(58) Field of Classification Search
CPC ................................. B60L 53/35; B60L 53/16
USPC ...................................................... 320/109
See application file for complete search history.

(56) References Cited

U.S. PATENT DOCUMENTS

| | | | |
|---|---|---|---|
| 5,091,687 A * | 2/1992 | Meyer | B60K 1/04 320/109 |
| 9,566,869 B1 * | 2/2017 | Benson | B66C 13/12 |
| 2014/0354229 A1 * | 12/2014 | Zhao | B60L 53/126 320/109 |
| 2018/0001777 A1 | 1/2018 | Kilic | |
| 2018/0086219 A1 | 3/2018 | Malek et al. | |
| 2018/0222340 A1 * | 8/2018 | Zhao | G06Q 10/1093 |
| 2019/0001831 A1 * | 1/2019 | Schutz | B67D 7/0401 |
| 2019/0061542 A1 * | 2/2019 | Zhao | B25J 9/046 |
| 2020/0009977 A1 * | 1/2020 | Park | B60L 53/37 |
| 2020/0009978 A1 * | 1/2020 | Shin | B60L 53/66 |
| 2020/0031248 A1 * | 1/2020 | Kwak | H02J 7/0042 |
| 2021/0001736 A1 * | 1/2021 | Schoob | B60L 53/37 |

FOREIGN PATENT DOCUMENTS

| | | | | |
|---|---|---|---|---|
| CN | 104241948 A | 12/2014 | | |
| CN | 204947655 U | 1/2016 | | |
| CN | 206884780 U | 1/2018 | | |
| DE | 102015213160 A1 * | 1/2017 | ............. | B60L 53/35 |
| JP | 2017-046398 A | 3/2017 | | |
| KR | 101860797 B1 | 5/2018 | | |

* cited by examiner

*Primary Examiner* — Suresh Memula
(74) *Attorney, Agent, or Firm* — Sughrue Mion, PLLC

(57) ABSTRACT

A charging system includes: a plurality of charging devices, each including a device main body having one or more charging cables connected to the main body, the charging cables being equipped with respective charging plugs; and one or more arm mechanisms each being configured to grasp any one of the charging plugs of the charging devices and automatically insert and remove the grasped charging plug to and from a charging port of a vehicle located in a charging space. Further, a number of arm mechanisms is smaller than a number of charging cables.

7 Claims, 9 Drawing Sheets

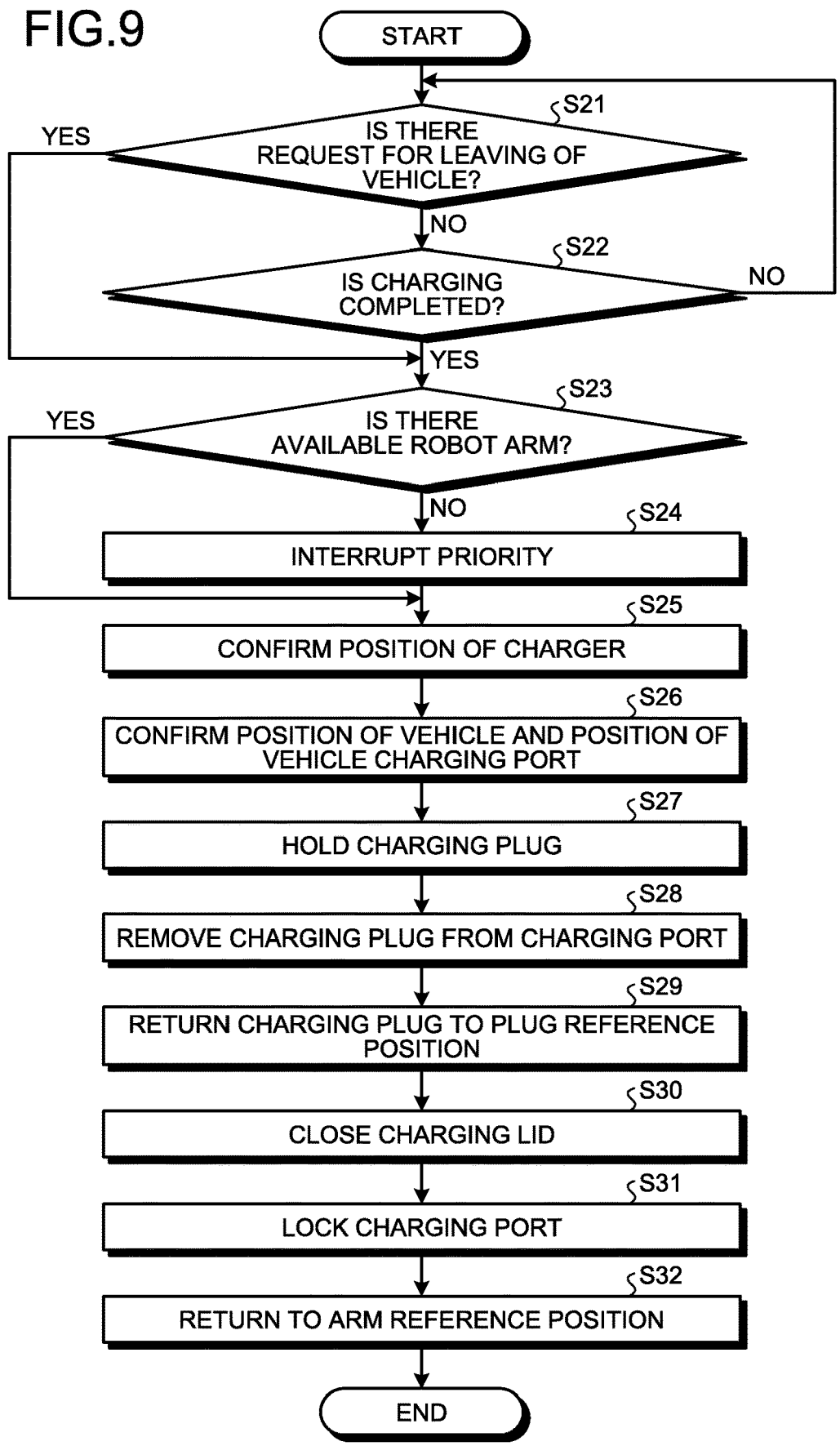

CHARGING SYSTEM

CROSS-REFERENCE TO RELATED APPLICATION(S)

The present application claims priority to and incorporates by reference the entire contents of Japanese Patent Application No. 2018-207552 filed in Japan on Nov. 2, 2018.

BACKGROUND

The present disclosure relates to a charging system.

Chinese Utility model Publication No. 204947655 discloses a charging system which connects a charging plug of a charging cable provided at a tip end of a robot arm to a charging port of a vehicle parked in a parking space of a parking facility and supplies power from a charging device via the charging cable and charging plug to automatically charge a battery of the vehicle.

SUMMARY

There is a need for providing a charging system which can realize a low cost.

According to an embodiment, a charging system includes: a plurality of charging devices, each including a device main body having one or more charging cables connected to the main body, the charging cables being equipped with respective charging plugs; and one or more arm mechanisms each grasping any one of the charging plugs of the charging devices and automatically inserting and removing the grasped charging plug to and from a charging port of a vehicle located in a charging space. Further, the number of arm mechanisms is smaller than the number of charging cables.

BRIEF DESCRIPTION OF THE DRAWINGS

FIG. 9 is a flowchart illustrating an example of automatic charging control when a vehicle leaves the parking facility.

DETAILED DESCRIPTION

In the charging system disclosed in Chinese Utility model Publication No. 204947655, in order to charge a plurality of vehicles, robot arms as many as the charging cables are required, resulting in an increase in cost.

Hereinafter, embodiments of a charging system of a parking facility according to the present disclosure is described. Note that, the present disclosure is not limited by the embodiments.

First Embodiment

Figure 1A:
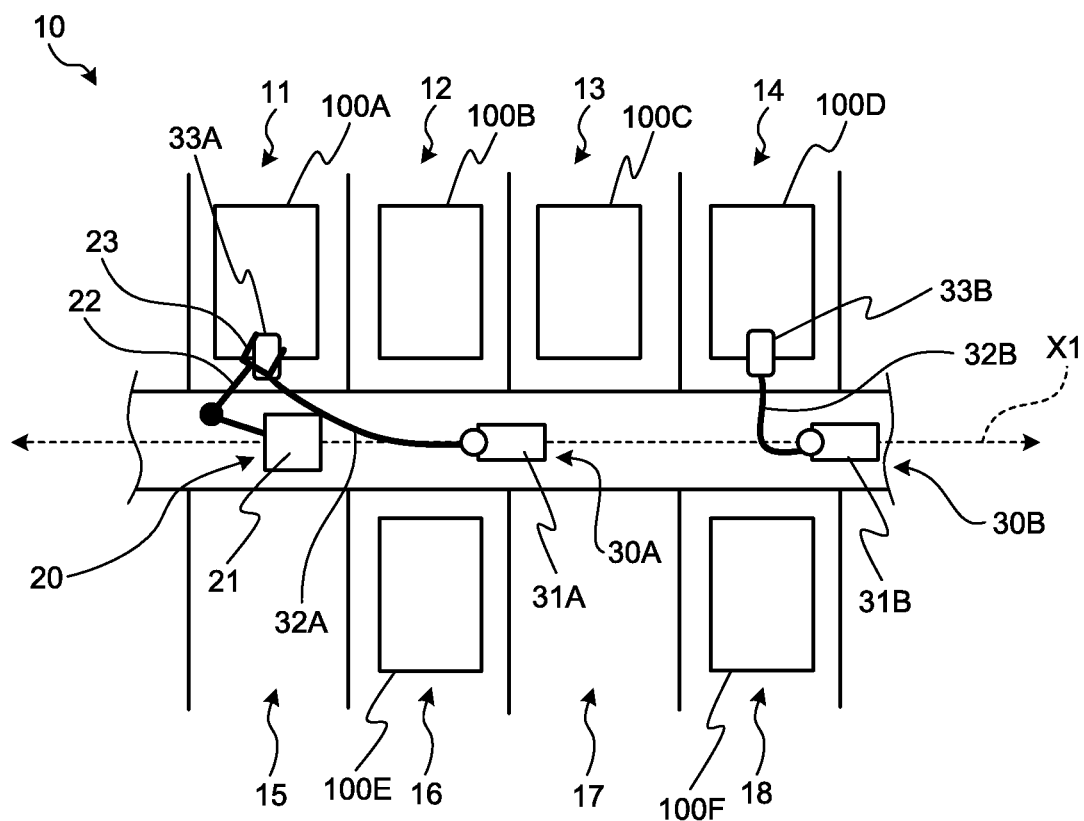
FIGS. 1A and 1B are views illustrating a charging system of a parking lot according to a first embodiment.
Figure 1B:
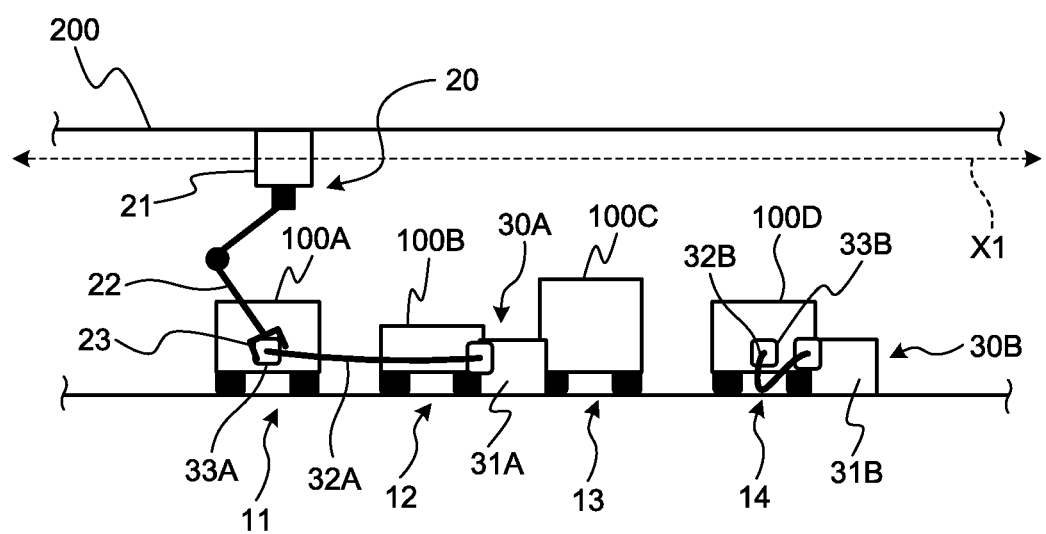

FIGS. 1A and 1B are views illustrating a charging system of a parking lot 10 according to a first embodiment in which FIG. 1A is a view of the parking lot 10 as seen from above, and FIG. 1B is a view of the parking lot 10 as seen from a side.

FIG. 1A illustrates eight parking spaces 11 to 18 among a plurality of parking spaces provided in the parking lot 10 which is a parking facility, and the parking spaces 11 to 18 are used as charging spaces. Out of the eight parking spaces 11 to 18, the parking spaces 11 to 14 are arranged side by side in a lateral direction (vehicle right-to-left direction) of each parking space, and the parking spaces 15 to 18 are arranged side by side in the lateral direction of each parking space. The parking spaces 11 to 14 and the parking spaces 15 to 18 face each other at a predetermined interval in a longitudinal direction (vehicle front-to-rear direction) of each parking space. Specifically, the parking space 11 and the parking space 15 face each other at a predetermined interval in the longitudinal direction of each parking space. Also, the parking space 12 and the parking space 16 face each other at a predetermined interval in the longitudinal direction of the parking space. Also, the parking space 13 and the parking space 17 face each other at a predetermined interval in the longitudinal direction of the parking space. Also, the parking space 14 and the parking space 18 face each other at a predetermined interval in the longitudinal direction of the parking space.

Between the parking spaces 11 to 14 and the parking spaces 15 to 18, one charging robot 20 including an arm mechanism and chargers 30A and 30B being two charging devices used for charging the vehicles 100 (corresponding to vehicles 100A to 100F in FIG. 1A, also simply referred to as the vehicles 100 in a case where the vehicles are not especially distinguished from one another) parked in the parking spaces 11 to 18 are provided. Note that, in a case where the chargers are not especially distinguished from one another, they are also simply referred to as the chargers 30.

The charging robot 20 and the chargers 30A and 30B are controlled by communicating with a management system (not illustrated) which forms the charging system of the parking lot 10 together with the charging robot 20 and the chargers 30A and 30B. Also, the management system can communicate with the vehicles 100 parked in the parking spaces 11 to 18, receive various pieces of information such as a charging request and a leaving request from the vehicle 100, and transmit an instruction signal for unlocking a charging port of the vehicle 100 and freely opening/closing a charging lid. Also, the management system can confirm entering and leaving of the vehicles 100 to and from the parking spaces 11 to 18 by signals from an imaging device (not illustrated), various sensors, the vehicles 100 and the like.

The charging robot 20 is formed of a robot main body 21 which is a movable moving body, one robot arm 22 a base end of which is connected to the robot main body 21, and a robot hand 23 provided on a tip end of the robot arm 22. Also, as illustrated in FIG. 1B, the robot main body 21 of the charging robot 20 is hung on a guide rail 200 which is a supporting member extending in the lateral direction of the parking space, and the robot main body 21 is autonomously movable in a direction of arrow X1 in the drawing along the guide rail 200. Note that, since the robot main body 21 of the charging robot 20 is hung on the guide rail 200, the charging robot 20 can be provided even in the parking space of the parking lot 10 which is two-dimensionally narrow.

The chargers 30A and 30B are formed of charger main bodies 31A and 31B, charging cables 32A and 32B, and charging plugs 33A and 33B, respectively. Also, as illustrated in FIG. 1B, the charger main bodies 31A and 31B are located below the guide rail 200, and are fixed to the ground at a predetermined interval therebetween in the direction of arrow X1 in the drawing being a moving direction of the robot main body 21.

In the charging system of the parking lot 10 according to the first embodiment, the charger 30A is arranged corresponding to four parking spaces which are the parking spaces 11, 12, 15, and 16, and the charger 30B is arranged corresponding to four parking spaces which are the parking spaces 13, 14, 17, and 18. That is, the charger 30A is used for charging the vehicles 100 parked in the parking spaces 11, 12, 15, and 16 located on the same side as the side on which the charging cable 32A is connected to the charger main body 31A with respect to the charger 30A. Also, the charger 30B is used for charging the vehicles 100 parked in the parking spaces 13, 14, 17, and 18 located on the same side as the side on which the charging cable 32B is connected to the charger main body 31B with respect to the charger 30B. As a result, the charging plugs 33A and 33B can be removed from and inserted into the charging port of the vehicle 100.

In a state illustrated in FIG. 1A, the vehicle 100A parked in the parking space 11, the vehicle 100B parked in the parking space 12, and the vehicle 100E parked in the parking space 16 can be charged using the charger 30A. Also, the vehicle 100C parked in the parking space 13, the vehicle 100D parked in the parking space 14, and the vehicle 100F parked in the parking space 18 can be charged using the charger 30B.

For example, when autonomously charging the vehicle 100A parked in the parking space 11 using the charger 30A, the robot main body 21 of the charging robot 20 autonomously moves along the guide rail 200 to a position where the robot hand 23 can grasp the charging plug 33A of the charger 30A by stretching the robot arm 22 of the charging robot 20. Then, after the robot hand 23 grasps the charging plug 33A, the robot main body 21 autonomously moves along the guide rail 200 to a position where the charging plug 33A can be inserted into a charging port (not illustrated) of the vehicle 100A, and stretches the robot arm 22 to insert the charging plug 33A into the charging port of the vehicle 100A. When the charging plug 33A is inserted into the charging port of the vehicle 100A, the charger 30A supplies power to the vehicle 100A from a power supply device provided on the charger main body 31A via the charging cable 32A and the charging plug 33A, and charges a battery which is a power storage device provided on the vehicle 100A. Also, after inserting the charging plug 33A into the charging port of the vehicle 100A, the charging robot 20 releases the robot hand 23 from the charging plug 33A and returns the robot arm 22 to an arm reference position set in advance.

When charging of the vehicle 100A is finished, the robot main body 21 of the charging robot 20 autonomously moves along the guide rail 200 to a position where the robot hand 23 can grasp the charging plug 33A inserted into the vehicle 100A by stretching the robot arm 22. Then, the charging robot 20 grasps the charging plug 33A by the robot hand 23 and removes the charging plug 33A from the vehicle 100A. Thereafter, in order to return the charging plug 33A to a plug reference position set in advance in the charger 30A, the robot main body 21 of the charging robot 20 moves along the guide rail 200 toward the charger 30A. Then, the charging robot 20 stretches the robot arm 22 and returns the charging plug 33A to the plug reference position.

Also, for example, when charging the vehicle 100D parked in the parking space 14 using the charger 30B, the robot main body 21 of the charging robot 20 autonomously moves along the guide rail 200 to a position where the robot hand 23 can grasp the charging plug 33B of the charger 30B by stretching the robot arm 22 of the charging robot 20. Then, after the robot hand 23 grasps the charging plug 33B, the robot main body 21 autonomously moves along the guide rail 200 to a position where the charging plug 33B can be inserted into a charging port (not illustrated) of the vehicle 100D, and stretches the robot arm 22 to insert the charging plug 33B into the charging port of the vehicle 100D. When the charging plug 33B is inserted into the charging port of the vehicle 100D, the charger 30B supplies power to the vehicle 100D from a power supply device provided on the charger main body 31B via the charging cable 32B and the charging plug 33B, and charges a battery provided on the vehicle 100D. Also, after inserting the charging plug 33B into the charging port of the vehicle 100D, the charging robot 20 releases the robot hand 23 from the charging plug 33B and returns the robot arm 22 to an arm reference position set in advance.

When charging of the vehicle 100D is finished, the robot main body 21 of the charging robot 20 autonomously moves along the guide rail 200 to a position where the robot hand 23 can grasp the charging plug 33B inserted into the vehicle 100D by stretching the robot arm 22. Then, the charging robot 20 grasps the charging plug 33B by the robot hand 23 and removes the charging plug 33B from the vehicle 100D. Thereafter, in order to return the charging plug 33B to a plug reference position set in advance in the charger 30B, the robot main body 21 of the charging robot 20 moves along the guide rail 200 toward the charger 30B. Then, the charging robot 20 stretches the robot arm 22 and returns the charging plug 33B to the plug reference position.

Also, the charging robot 20 can grasp any charging plug 33 to insert into the charging port of the vehicle 100 parked in another parking space after removing the charging plugs 33A and 33B from the charging ports of the vehicles 100A and 100D the charging of which is completed.

In this manner, the one charging robot 20 and two chargers 30A and 30B can automatically charge the vehicles 100 parked in the parking spaces 11 to 18 of the parking lot 10. As a result, it is possible to charge a large number of vehicles 100 while suppressing a cost of the charging system.

Also, in the charging system of the parking lot 10 according to the first embodiment, the one robot arm 22 is used in common for the two charging cables 32A and 32B. As a result, the charging system of the parking lot 10 according to the first embodiment can realize a lower cost than in a case where two charging robots 20 provided with one robot arm 22 are provided corresponding to the two charging cables 32A and 32, or two robot arms 22 are provided for one charging robot 20.

Also, in the charging system of the parking lot 10 according to the first embodiment, since the number of charging cables 32 is smaller than the number of parking spaces used as the charging spaces, a lower cost can be realized than in a case where the charging cables 32 are provided for the respective parking spaces.

Note that, in the charging system of the parking lot 10 according to the first embodiment, in a case where the charging port of vehicle 100 is located in a position where the charging plugs 33A and 33B of the chargers 30A and 30B to be used cannot be inserted, it is possible to notify and urge a driver of the vehicle 100 to correct the position and the orientation of the vehicle 100. This makes it possible to notify a user of vehicle 100 to be charged that the automatic charging cannot currently be performed.

Figure 2A:
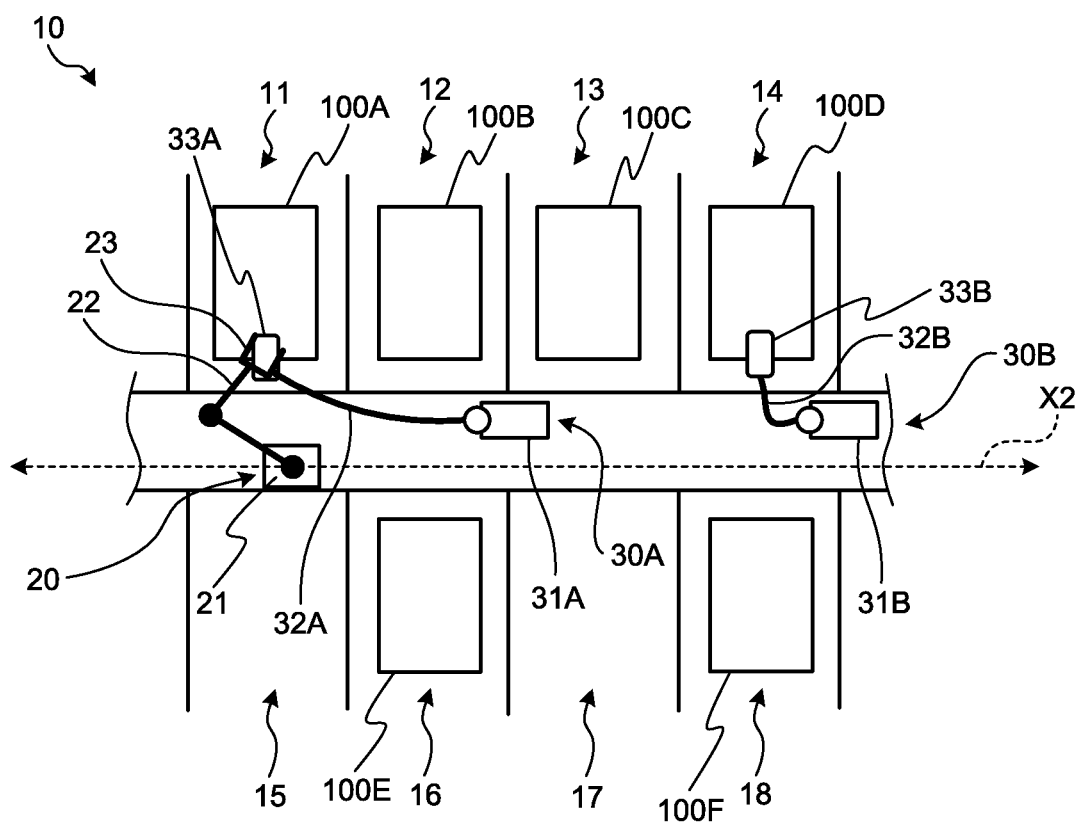
FIGS. 2A and 2B are views illustrating another example of the charging system of the parking lot according to the first embodiment.
Figure 2B:
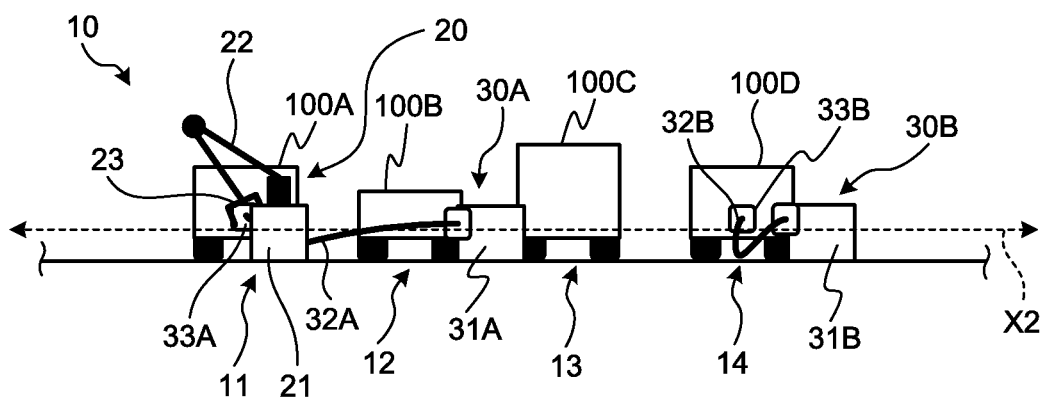

In addition, in the charging system of the parking lot 10 according to the first embodiment, as illustrated in FIGS. 2A and 2B, the charging robot 20 may be provided so as to be autonomously movable in a direction of arrow X2 in the drawing, the same direction as the direction in which the parking spaces 11 to 14 are arranged and the direction in which the parking spaces 15 to 18 are arranged on the ground on which the chargers 30A and 30B are fixed. In this case also, the number of robot arms 22 of the charging robot 20 can be made smaller than the number of charging cables 32A and 32B of the chargers 30A and 30B, and the vehicles 100 parked in the parking spaces 11 to 18 can be automatically charged.

Second Embodiment

Figure 3:
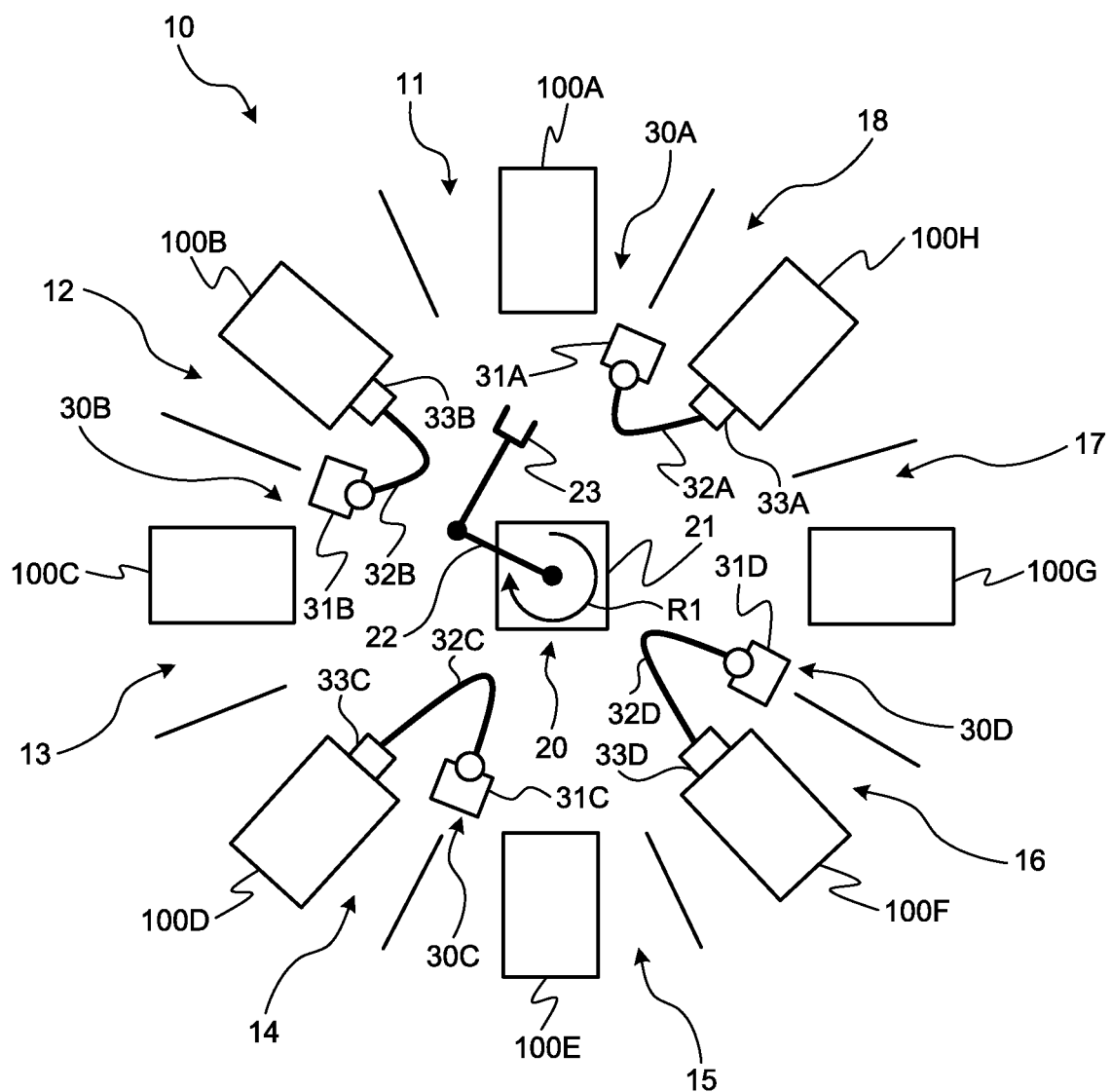
FIG. 3 is a view illustrating a charging system of a parking lot according to a second embodiment.

FIG. 3 is a view illustrating a charging system of a parking lot 10 according to a second embodiment, the view of the parking lot 10 as seen from above. Note that configurations of a charging robot 20 and a charger 30 are similar to those in the first embodiment, so that the description thereof is omitted.

The charging system of the parking lot 10 according to the second embodiment is provided with one charging robot 20 and four chargers 30A to 30D controllable by a management system (not illustrated) in which eight parking spaces 11 to 18 are arranged in a circle around the charging robot 20. In the charging system of the parking lot 10 according to the second embodiment, the parking spaces 11 to 18 are used as charging spaces. The charging robot 20 is fixed to the ground, and charger main bodies 31A to 31D of the chargers 30A to 30D are fixed to the ground at predetermined intervals between one another in a circular direction centered on the charging robot 20.

The charging robot 20 is such that a base end of a robot arm 22 is rotatably connected to the center of an upper surface of a robot main body 21 in a direction of arrow R1 in the drawing. Note that the robot arm 22 may be rotatable in both the direction of arrow R1 in the drawing and the direction opposite to the direction of arrow R1 in the drawing.

In the charging system of the parking lot 10 according to the second embodiment, one charger 30 is arranged corresponding to two parking spaces adjacent in the circular direction. Specifically, the charger 30A is arranged between the parking spaces 11 and 18 corresponding to the parking spaces 11 and 18. Also, the charger 30B is arranged between the parking spaces 12 and 13 corresponding to the parking spaces 12 and 13. Also, the charger 30C is arranged between the parking spaces 14 and 15 corresponding to the parking spaces 14 and 15. Also, the charger 30D is arranged between the parking spaces 16 and 17 corresponding to the parking spaces 16 and 17.

Then, in a state illustrated in FIG. 3, a vehicle 100A parked in the parking space 11 and a vehicle 100H parked in the parking space 18 can be charged using the charger 30A. Also, a vehicle 100B parked in the parking space 12 and a vehicle 100C parked in the parking space 13 can be charged using the charger 30B. Also, a vehicle 100D parked in the parking space 14 and a vehicle 100E parked in the parking space 15 can be charged using the charger 30C. Also, a vehicle 100F parked in the parking space 16 and a vehicle 100G parked in the parking space 17 can be charged using the charger 30D.

For example, when automatically charging the vehicle 100H parked in the parking space 18 using the charger 30A, the robot arm 22 of the charging robot 20 is rotated in the direction of arrow R1 in the drawing and a robot hand 23 grasps a charging plug 33A of the charger 30A. After the robot hand 23 grasps the charging plug 33A, the robot arm 22 is rotated in the direction of arrow R1 in the drawing to insert the charging plug 33A into a charging port (not illustrated) of the vehicle 100H. When the charging plug 33A is inserted into the charging port of the vehicle 100H, the charger 30A supplies power to the vehicle 100H from a power supply device provided on the charger main body 31A via a charging cable 32A and the charging plug 33A, and charges a battery provided on the vehicle 100H. After inserting the charging plug 33A into the charging port of the vehicle 100A, the charging robot 20 releases the robot hand 23 from the charging plug 33A and returns the robot arm 22 to an arm reference position set in advance.

When charging of the vehicle 100H is finished, the charging robot 20 rotates the robot arm 22 in the direction of arrow R1 in the drawing and grasps the charging plug 33A inserted into the charging port of the vehicle 100H with the robot hand 23 to remove the charging plug 33A from the vehicle 100H. Thereafter, the charging robot 20 rotates the robot arm 22 in the direction of arrow R1 in the drawing and returns the charging plug 33A to a plug reference position set in advance in the charger 30A.

In this manner, in the charging system of the parking lot 10 according to the second embodiment, the one charging robot 20 and four chargers 30A to 30D can automatically charge the vehicles 100A to 100H parked in the parking spaces 11 to 18. As a result, it is possible to charge a large number of vehicles 100 while suppressing a cost of the charging system.

The number of robot arms 22 of the charging robot 20 is smaller than the number of charging cables 32A and 32B of the chargers 30A and 30B. That is, in the charging system of the parking lot 10 according to the second embodiment, one robot arm 22 is used in common for four charging cables 32A to 32D. As a result, the charging system of the parking lot 10 according to the second embodiment can realize a lower cost than in a case where four charging robots 20 provided with one robot arm 22 are provided corresponding to the four charging cables 32A to 32D, respectively, or four robot arms 22 are provided for one charging robot 20.

Also, in the charging system of the parking lot 10 according to the second embodiment, since the number of charging cables 32 is smaller than the number of parking spaces used as the charging spaces, a lower cost can be realized than in a case where the charging cables 32 are provided for the respective parking spaces.

Note that, in the charging system of the parking lot 10 according to the second embodiment, in a case where the charging port of the vehicle 100 is located in a position where the charging plugs 33A to 33D of the chargers 30A to 30D to be used cannot be inserted, it is possible to notify and urge a driver of the vehicle 100 to correct a position and orientation of the vehicle 100.

Third Embodiment

Figure 4:
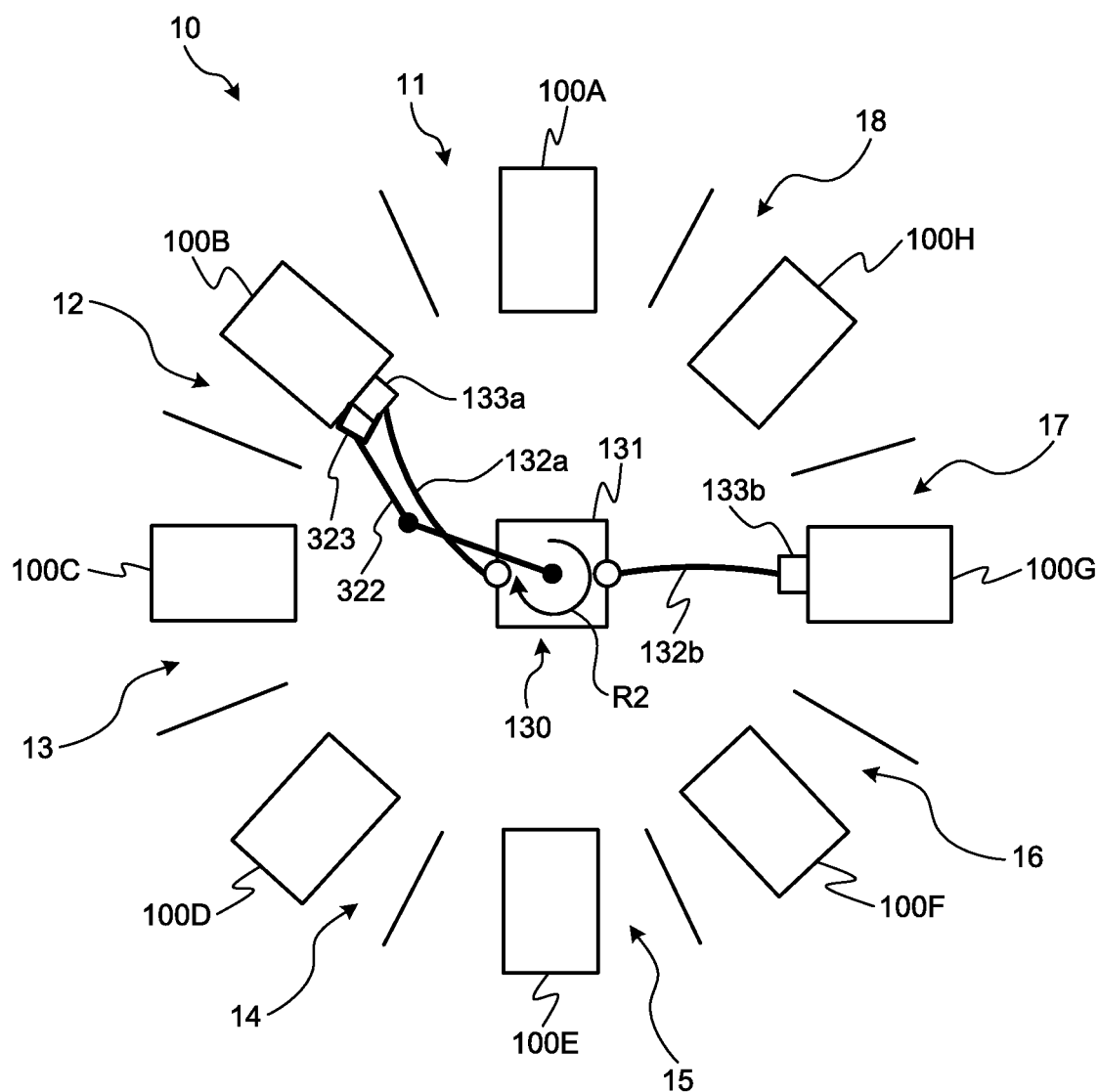
FIG. 4 is a view illustrating a charging system of a parking lot according to a third embodiment.

FIG. 4 is a view illustrating a charging system of a parking lot 10 according to a third embodiment, the view of the parking lot 10 as seen from above.

The charging system of the parking lot 10 according to the third embodiment is provided with a charging robot 130 formed by integrating a charging robot 20 and a charger 30 used in the first embodiment and the like. The charging robot 130 can be controlled by a management system (not illustrated). The charging robot 130 is formed of a robot main body 131 in which a power supply device is provided, one robot arm 322 a base end of which is connected to the center of an upper surface of the robot main body 131 so as to be rotatable in a direction of arrow R2 in the drawing, a robot hand 323 provided at a tip end of the robot arm 322, two charging cables 132a and 132b base ends of which are arranged so as to face the robot main body 131, and charging plugs 133a and 133b provided at tip ends of the charging cables 132a and 132b, respectively. In the charging robot 20, the robot main body 131 is fixed to the ground. Note that the robot arm 22 may be rotatable in both the direction of arrow R2 in the drawing and the direction opposite to the direction of arrow R2 in the drawing.

In the charging system of the parking lot 10 according to the third embodiment, eight parking spaces 11 to 18 are circularly arranged around the charging robot 130, and the parking spaces 11 to 18 are used as charging spaces. In the charging system of the parking lot 10 according to the third embodiment, the charging robot 130 is arranged corresponding to all the parking spaces of the parking spaces 11 to 18, and in a state illustrated in FIG. 4, the charging robot 130 can charge vehicles 100A to 100H parked in the parking spaces 11 to 18 by rotating the robot arm 322 in the direction of arrow R2 in the drawing.

When charging the vehicles 100B to 100D parked in the parking spaces 12 to 14, the charging cable 132a of the charging robot 130 is used. Also, when charging the vehicles 100F to 100H parked in the parking spaces 16 to 18, the charging cable 132b of the charging robot 130 is used. When charging the vehicles 100A and 100E parked in the parking spaces 11 and 15, the two charging cables 132a and 132b are selectively used.

For example, when automatically charging the vehicle 100B parked in the parking space 12, the robot hand 323 of the charging robot 130 grasps the charging plug 133a of the charging cable 132a. After the robot hand 323 grasps the charging plug 133a, the robot arm 322 is rotated in the direction of arrow R2 in the drawing to insert the charging plug 133a into a charging port (not illustrated) of the vehicle 100B. When the charging plug 133a is inserted into the charging port of the vehicle 100B, the charging robot 130 supplies power to the vehicle 100B from a power supply device provided on the robot main body 131 via the charging cable 132a and the charging plug 133a, and charges a battery provided on the vehicle 100B. After inserting the charging plug 133a into the charging port of the vehicle 100B, the charging robot 130 releases the robot hand 323 from the charging plug 133a and returns the robot arm 322 to an arm reference position set in advance.

When charging of the vehicle 100B is finished, the charging robot 130 rotates the robot arm 322 in the direction of arrow R2 in the drawing, and grasps the charging plug 133a inserted into the charging port of the vehicle 100B with the robot hand 323 to remove the charging plug 133a from the vehicle 100B. Thereafter, the charging robot 130 rotates the robot arm 322 in the direction of arrow R2 in the drawing, and returns the charging plug 133a to a plug reference position set in advance in the charging robot 130.

In this manner, the one charging robot 130 can automatically charge the vehicles 100A to 100H parked in the parking spaces 11 to 18 in the charging system of the parking lot 10 according to the third embodiment. As a result, it is possible to charge a large number of vehicles 100 while suppressing a cost of the charging system.

In the charging system of the parking lot 10 according to the third embodiment, the one robot arm 322 is used in common for the two charging cables 132a and 132b, respectively. As a result, the charging system of the parking lot 10 according to the third embodiment can realize a lower cost than in a case where two robot arms 322 are provided corresponding to the two charging cables 132a and 132b.

Also, in the charging system of the parking lot 10 according to the third embodiment, since the number of charging cables 132 is smaller than the number of parking spaces used as the charging spaces, a lower cost can be realized than in a case where the charging cables 132 are provided for the respective parking spaces.

Fourth Embodiment

Figure 5A:
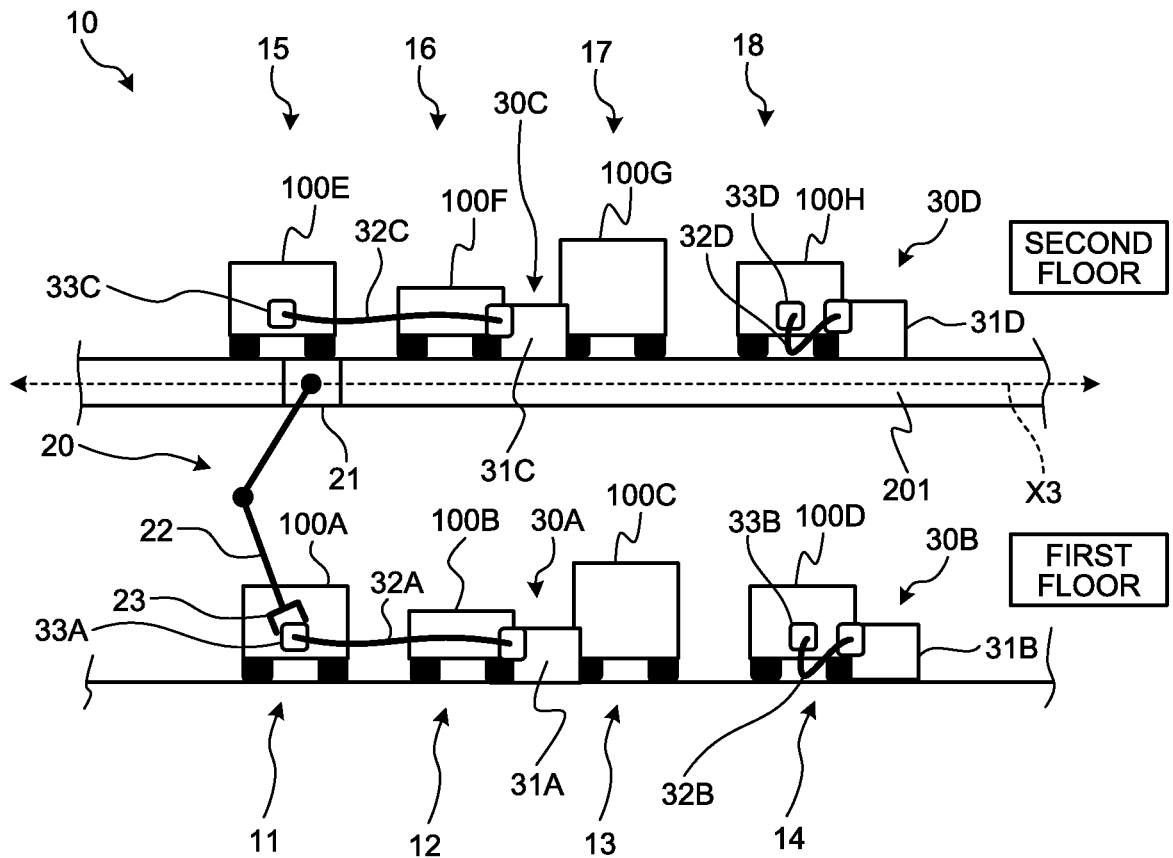
FIGS. 5A and 5B are views illustrating a charging system of a parking lot according to a fourth embodiment.
Figure 5B:
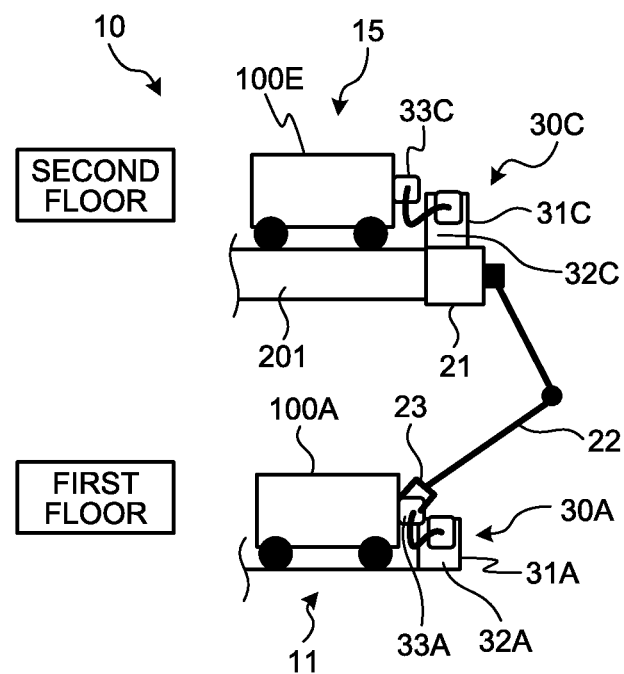

FIGS. 5A and 5B are views illustrating a charging system of a parking lot 10 according to a fourth embodiment in which FIG. 5A is a view of the parking lot 10 as seen in a longitudinal direction of a parking space and FIG. 5B is a view of the parking lot 10 as seen in a lateral direction of the parking space. Note that configurations of a charging robot 20 and a charger 30 are similar to those in the first embodiment, so that the description thereof is omitted.

In the charging system of the parking lot 10 according to the fourth embodiment, the parking lot 10 is a three-dimensional parking lot, and FIGS. 5A and 5B illustrate a first floor and a second floor of the parking lot 10. On the first floor of the parking lot 10, four parking spaces 11 to 14 are arranged side by side in the lateral direction of the parking space, and on the second floor of the parking lot 10, four parking spaces 15 to 18 are arranged side by side in the lateral direction of the parking space. In the charging system of the parking lot 10 according to the fourth embodiment, the parking spaces 11 to 18 are used as charging spaces.

The charging system of the parking lot 10 according to the fourth embodiment is provided with one charging robot 20 and four chargers 30A to 30D which can be controlled by a management system (not illustrated).

A guide rail 201 being a supporting member extending in a direction in which the parking spaces are arranged is provided below a floor of the second floor of the parking lot 10, and a robot main body 21 of the charging robot 20 is hung so as to be autonomously movable in a direction of arrow X3 in the drawing along an end face of the guide rail 201.

Among the four chargers 30A to 30D, the chargers 30A and 30B are fixed to a floor of the first floor of the parking lot 10 at a predetermined interval therebetween in the direction of arrow X3 in the drawing, which is the moving direction of the robot main body 21. Also, the chargers 30C and 30D are fixed to the floor of the second floor of the parking lot 10 at a predetermined interval therebetween in the direction of arrow X3 in the drawing.

In the charging system of the parking lot 10 according to the fourth embodiment, one charger 30 is arranged corresponding to two parking spaces adjacent in the direction of arrow X3 in the drawing. That is, the charger 30A is arranged on a side opposite to the parking space with respect to the parking space 12 corresponding to the parking spaces 11 and 12. Also, the charger 30B is arranged on a side opposite to the parking space 13 with respect to the parking space 14 corresponding to the parking spaces 13 and 14. Also, the charger 30C is arranged on a side opposite to the parking space 15 with respect to the parking space 16 corresponding to the parking spaces 15 and 16. Also, the charger 30D is arranged on a side opposite to the parking space 17 with respect to the parking space 18 corresponding to the parking spaces 17 and 18.

Then, in the charging system of the parking lot 10 according to the forth embodiment, the charger 30A is used for charging vehicles 100A and 100B parked in the parking spaces 11 and 12 located on the same side as the side on which a charging cable 32A is connected to a charger main body 31A with respect to the charger 30A. Also, the charger 30B is used for charging vehicles 100C and 100D parked in the parking spaces 13 and 14 located on the same side as the side on which a charging cable 32B is connected to a charger main body 31B with respect to the charger 30B. Also, the charger 30C is used for charging vehicles 100E and 100F parked in the parking spaces 15 and 16 located on the same side as the side on which a charging cable 32C is connected to a charger main body 31C with respect to the charger 30C. Also, the charger 30D is used for charging vehicles 100G and 100H parked in the parking spaces 17 and 18 located on the same side as the side on which a charging cable 32D is connected to a charger main body 31D with respect to the charger 30D.

For example, when automatically charging the vehicle 100A parked in the parking space 11 using the charger 30A on the first floor of the parking lot 10, the robot main body 21 of the charging robot 20 autonomously moves along the guide rail 201 to a position where a robot hand 23 can grasp a charging plug 33A of the charger 30A by stretching a robot arm 22 of the charging robot 20 downward. Then, after the robot hand 23 grasps the charging plug 33A, the robot main body 21 autonomously moves along the guide rail 201 to a position where the charging plug 33A can be inserted into a charging port (not illustrated) of the vehicle 100A, and inserts the charging plug 33A into the charging port of the vehicle 100A by stretching the robot arm 22. When the charging plug 33A is inserted into the charging port of the vehicle 100A, the charger 30A supplies power to the vehicle 100A from a power supply device provided on the charger main body 31A via the charging cable 32A and the charging plug 33A, and charges a battery provided on the vehicle 100A. Also, after inserting the charging plug 33A into the charging port of the vehicle 100A, the charging robot 20 releases the robot hand 23 from the charging plug 33A and returns the robot arm 22 to an arm reference position set in advance.

When charging of the vehicle 100A is finished, the robot main body 21 of the charging robot 20 autonomously moves along the guide rail 201 to a position where the robot hand 23 can grasp the charging plug 33A inserted into the vehicle 100A by stretching the robot arm 22 downward. Then, the charging robot 20 grasps the charging plug 33A by the robot hand 23 and removes the charging plug 33A from the vehicle 100A. Thereafter, in order to return the charging plug 33A to a plug reference position set in advance in the charger 30A, the robot main body 21 of the charging robot 20 moves along the guide rail 201 toward the charger 30A. Then, the charging robot 20 stretches the robot arm 22 and returns the charging plug 33A to the plug reference position.

For example, when charging the vehicle 100E parked in the parking space 15 using the charger 30C on the second floor of the parking lot 10, the robot main body 21 of the charging robot 20 autonomously moves along the guide rail 201 to a position where the robot hand 23 can grasp a charging plug 33C of the charger 30C by stretching the robot arm 22 of the charging robot 20 upward. Then, after the robot hand 23 grasps the charging plug 33C, the robot main body 21 autonomously moves along the guide rail 201 to a position where the charging plug 33C can be inserted into a charging port (not illustrated) of the vehicle 100E, and inserts the charging plug 33C into the charging port of the vehicle 100E by stretching the robot arm 22. When the charging plug 33C is inserted into the charging port of the vehicle 100E, the charger 30C supplies power to the vehicle 100E from a power supply device provided on the charger main body 31C via the charging cable 32C and the charging plug 33C, and charges a battery provided on the vehicle 100E. Also, after inserting the charging plug 33C into the charging port of the vehicle 100E, the charging robot 20 releases the robot hand 23 from the charging plug 33C and returns the robot arm 22 to an arm reference position set in advance.

When charging of the vehicle 100E is finished, the robot main body 21 of the charging robot 20 autonomously moves along the guide rail 201 to a position where the robot hand 23 can grasp the charging plug 33C inserted into the vehicle 100E by stretching the robot arm 22. Then, the charging robot 20 grasps the charging plug 33C by the robot hand 23 and removes the charging plug 33C from the vehicle 100E. Thereafter, in order to return the charging plug 33C to a plug reference position set in advance in the charger 30C, the robot main body 21 of the charging robot 20 moves along the guide rail 201 toward the charger 30C. Then, the charging robot 20 stretches the robot arm 22 and returns the charging plug 33B to the plug reference position.

In this manner, in the charging system of the parking lot 10 according to the fourth embodiment, the one charging robot 20 and four chargers 30A to 30D can automatically charge the vehicles 100A to 100H parked in the parking spaces 11 to 18 of the first and second floors of the parking lot 10. As a result, it is possible to charge a large number of vehicles 100 while suppressing a cost of the charging system.

In the charging system of the parking lot 10 according to the fourth embodiment, the one robot arm 22 is used in common for the four charging cables 32A to 32D. As a result, the charging system of the parking lot according to the fourth embodiment can realize a lower cost than in a case where four robot arms 22 are provided corresponding to the four charging cables 32A to 32D.

Also, in the charging system of the parking lot 10 according to the fourth embodiment, the one charging robot 20 can charge the vehicles 100A to 100D parked in the parking spaces 11 to 14 of the first floor and the vehicles 100E to 100H parked in the parking spaces 15 to 18 of the second floor. Therefore, a lower cost can be realized than in a case where two charging robots 20 are used corresponding to the parking spaces 11 to 14 on the first floor and the parking spaces 15 to 18 on the second floor.

Also, in the charging system of the parking lot 10 according to the fourth embodiment, since the number of charging cables 32 is smaller than the number of parking spaces used as the charging spaces, a lower cost can be realized than in a case where the charging cables 32 are provided for the respective parking spaces.

Note that, in the charging system of the parking lot 10 according to the fourth embodiment, in a case where the charging port of the vehicle 100 is located in a position where the charging plugs 33A to 33D of the chargers 30A to 30D to be used cannot be inserted, it is possible to notify a driver of the vehicle 100 to modify a position and orientation of the vehicle 100.

Fifth Embodiment

Figure 6:
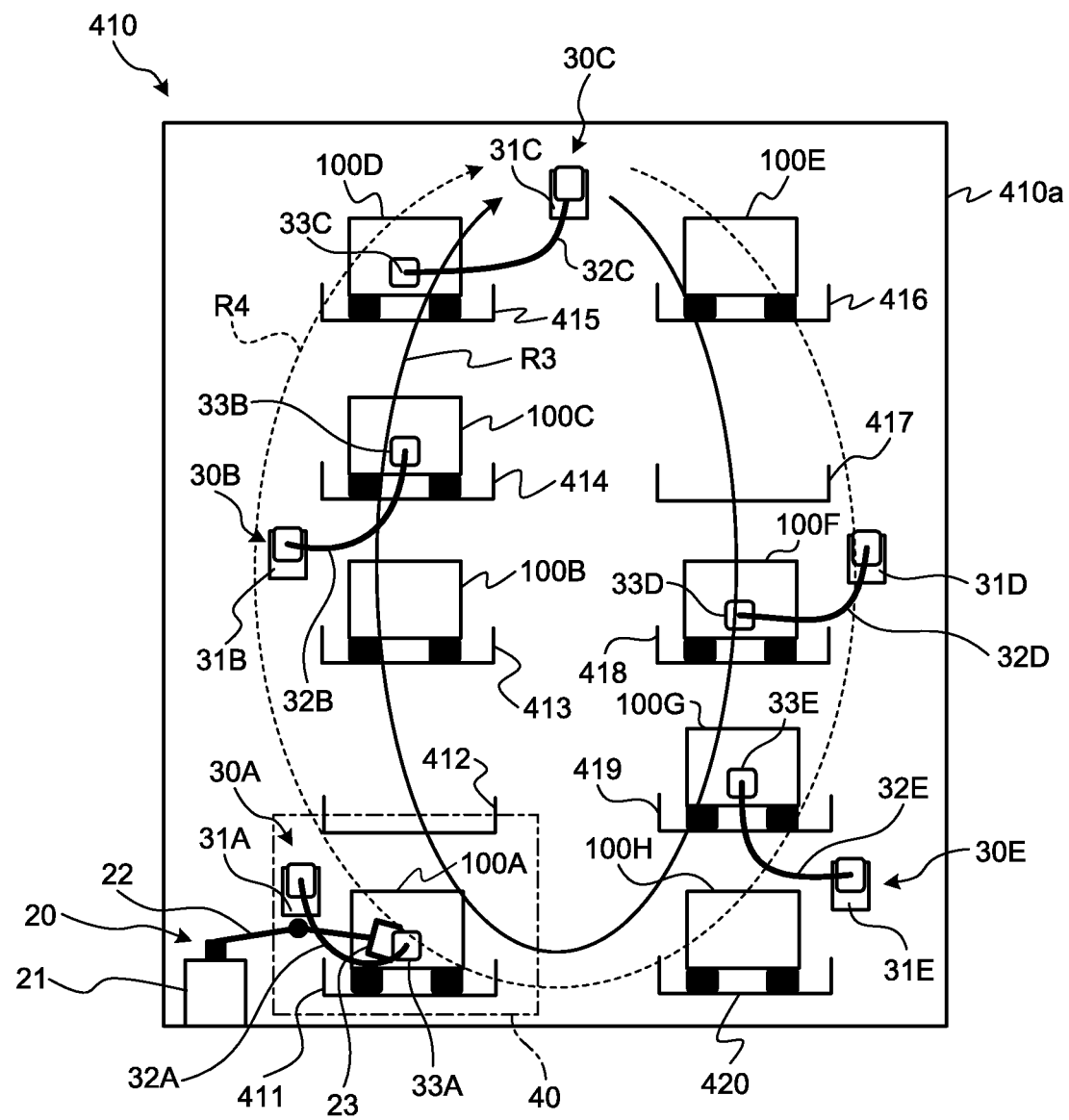
FIG. 6 is a view illustrating a charging system of a parking facility according to a fifth embodiment.

FIG. 6 is a view illustrating a charging system of a parking facility 410 according to a fifth embodiment. Note that configurations of a charging robot 20 and a charger 30 are similar to those in the first embodiment, so that the description thereof is omitted.

The charging system of the parking facility 410 according to the fifth embodiment is provided with ten pallets 411 to 420 which are parking spaces on which vehicles 100 can be mounted in a building 410a. The pallets 411 to 420 are configured so as to be rotatable by a drive mechanism (not illustrated) while maintaining a constant interval in a direction of arrow R3 in the drawing. Entering and leaving of the vehicle 100 to and from the pallets 411 to 420 are performed by allowing the vehicle 100 to enter and leave the building 410a via a vehicle entrance 40 provided at a lower portion of the building 410a. In the charging system of the parking facility 410 according to the fifth embodiment, the pallets 411 to 420 are used as charging space.

The parking facility 410 according to the fifth embodiment is provided with one charging robot 20 and four chargers 30A to 30D which can be controlled by a management system (not illustrated). The charging robot 20 is arranged in the vicinity of the vehicle entrance 40 in the building 410a, in a position not interfering with rotary movement of the pallets 411 to 420 in the building 410a. The chargers 30A to 30D are such that one charger 30 is arranged corresponding to two pallets adjacent in the rotational direction of the pallets 411 to 420 (direction of arrow R3 in the drawing). Specifically, the charger 30A is arranged between the pallet 411 and the pallet 412 corresponding to the pallet 411 and the pallet 412. Also, the charger 30B is arranged between the pallet 413 and the pallet 414 corresponding to the pallet 413 and the pallet 414. Also, the charger 30C is arranged between the pallet 415 and the pallet 416 corresponding to the pallet 415 and the pallet 416. Also, the charger 30D is arranged between the pallet 419 and the pallet 420 corresponding to the pallet 419 and the pallet 420.

The chargers 30A to 30E are configured to be rotatable in conjunction with the pallets 411 to 420 by a driving mechanism (not illustrated) so as to maintain a predetermined interval in a direction of arrow R4 in the drawing which is the same direction as the direction of arrow R3 in the drawing being the rotational direction of the pallets 411 to 420.

In a state illustrated in FIG. 6, a vehicle 100A parked on the pallet 411 can be charged using the charger 30A. Note that, although the vehicle 100 is not parked on the pallet 412 in FIG. 6, when the vehicle 100 is parked on the pallet 412, the vehicle 100 parked on either the pallet 411 or the pallet 412 can be charged with the charger 30A. Also, the vehicle 100 of either a vehicle 100B parked on the pallet 413 or a vehicle 100C parked on the pallet 414 can be charged using the charger 30B. In FIG. 6, the vehicle 100C parked on the pallet 414 is charged using the charger 30B. Also, the vehicle 100 of either a vehicle 100D parked on the pallet 415 and a vehicle 100E parked on the pallet 416 can be charged using the charger 30C. In FIG. 6, the vehicle 100D parked on the pallet 415 is charged using the charger 30C. Also, a vehicle 100F parked on the pallet 418 can be charged using the charger 30D. Note that, although the vehicle 100 is not parked on the pallet 417 in FIG. 6, in a case where the vehicle 100 is parked on the pallet 417, the vehicle 100 parked on either the pallet 417 or the pallet 418 can be charged with the charger 30D. Also, the vehicle 100 of either a vehicle 100G parked on the pallet 419 and a vehicle 100H parked on the pallet 420 can be charged using the charger 30E. In FIG. 6, the vehicle 100G parked on the pallet 419 is charged using the charger 30E.

For example, when automatically charging the vehicle 100A parked on the pallet 411 using the charger 30A, first, in a state in which the pallet 411 is stopped in a position of the vehicle entrance 40, a robot arm 22 of a charging robot 20 is stretched toward a charger 30A and a robot hand 23 grasps a charging plug 33A of the charger 30A. After the robot hand 23 grasps the charging plug 33A, the robot arm 22 is stretched toward the vehicle 100A to insert the charging plug 33A into a charging port (not illustrated) of the vehicle 100A. When the charging plug 33A is inserted into the charging port of the vehicle 100A, the charger 30A supplies power to the vehicle 100A from a power supply device provided on the charger main body 31A via the charging cable 32A and the charging plug 33A, and charges a battery provided on the vehicle 100A. After inserting the charging plug 33A into the charging port of the vehicle 100A, the charging robot 20 releases the robot hand 23 from the charging plug 33A and returns the robot arm 22 to an arm reference position set in advance. Note that during the charging of the vehicle 100A by the charger 30A, the pallet 411 rotates in the direction of arrow R3 in the drawing in a state in which the charging plug 33A is inserted into the charging port of the vehicle 100A, and the charger 30A is also rotated in the direction of arrow R4 in the drawing in conjunction with this.

When the charging of the vehicle 100A is finished, the charging robot 20 stretches the robot arm 22 toward the vehicle 100 and grasps the charging plug 33A inserted into the charging port of the vehicle 100A with the robot hand 23 to remove the charging plug 33A from the vehicle 100A in a state in which the pallet 411 comes again the position of the vehicle entrance 40 to stop. Thereafter, the charging robot 20 stretches the robot arm 22 toward the charger 30A and returns the charging plug 33A to a plug reference position set in advance in the charger 30A. Then, the charging robot 20 returns the robot arm 22 to an arm reference position set in advance.

As described above, the one charging robot 20 and four chargers 30A to 30E can automatically charge the vehicles 100 parked on the pallets 411 to 420 of the parking facility 410. As a result, it is possible to charge a large number of vehicles 100 while suppressing a cost of the charging system.

In the charging system of the parking facility 410 according to the fifth embodiment, the one robot arm 22 is used in common for the five charging cables 32A to 32E. As a result, the charging system of the parking lot 410 according to the fifth embodiment can realize a lower cost than in a case where five robot arms 22 are provided corresponding to the five charging cables 32A to 32E.

Also, in the charging system of the parking facility 410 according to the fifth embodiment, since the number of charging cables 32 is smaller than the number of pallets used as the charging spaces, a lower cost can be realized than in a case where the charging cables 32 are provided for the respective pallets.

Note that, in the charging system of the parking facility 410 according to the fifth embodiment, in a case where the charging port of the vehicle 100 is located in a position where the charging plugs 33A to 33E of the chargers 30A to 30E to be used cannot be inserted, it is possible to notify and urge a driver of the vehicle 100 to correct a position and orientation of the vehicle 100.

Figure 7:
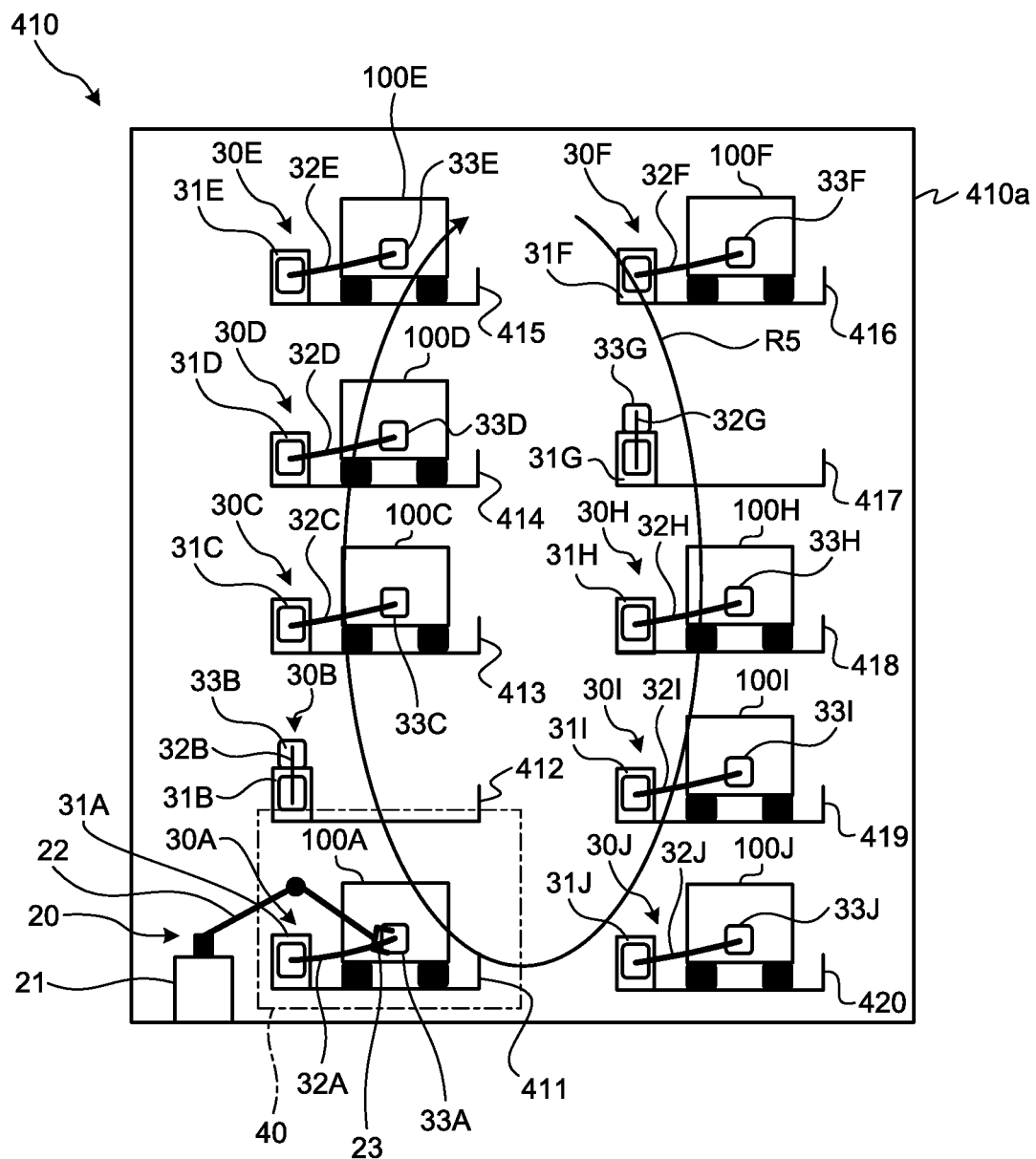
FIG. 7 is a view illustrating another example of the charging system of the parking facility according to the fifth embodiment.

In addition, in the charging system of the parking facility 410 according to the fifth embodiment, as illustrated in FIG. 7, a total of ten chargers 30A to 30J may be provided for the ten pallets 411 to 420, respectively. In this case, the chargers 30A to 30J are installed on the pallets 411 to 420, and the pallets 411 to 420 and the chargers 30A to 30J can be configured so as to be rotatable together by a drive mechanism (not illustrated) while maintaining a constant interval in a direction of arrow R5 in the drawing.

In the charging system of the parking facility 410 illustrated in FIG. 7, the one robot arm 22 is commonly used for the ten charging cables 32A to 32J, so that a lower cost can be realized than in a case where ten robot arms 22 are provided corresponding to the ten charging cables 32A to 32J.

Figure 8:
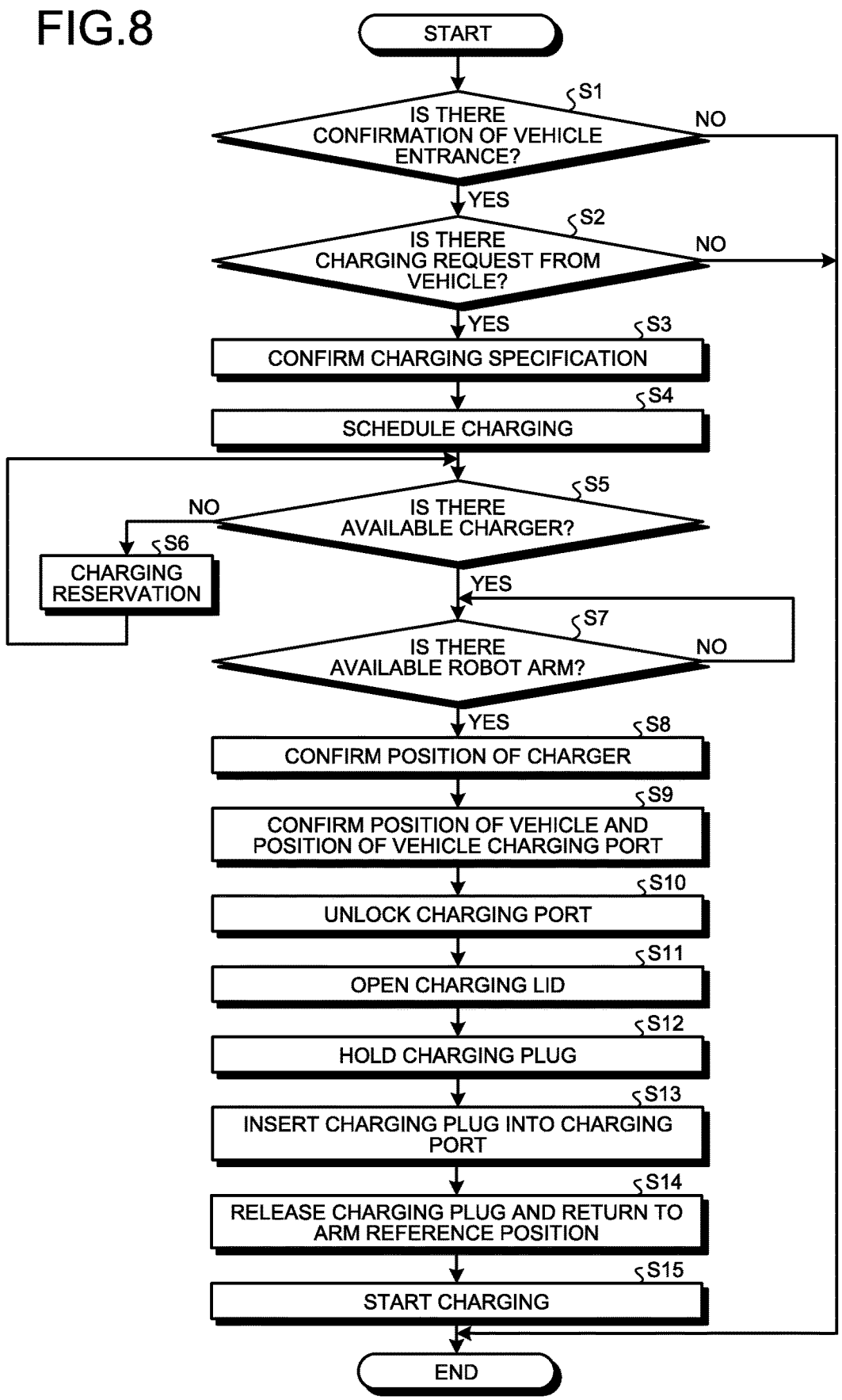
FIG. 8 is a flowchart illustrating an example of automatic charging control when a vehicle enters the parking facility.

FIG. 8 is a flowchart illustrating an example of automatic charging control when the vehicle 100 enters the parking facility.

First, the management system provided in the parking facility determines whether there is a confirmation of vehicle entrance (step S1). In a case where there is no confirmation of the vehicle entrance (No at step S1), the management system finishes a series of control. On the other hand, in a case where there is the confirmation of the vehicle entrance (Yes at step S1), the management system determines whether there is a charging request from the vehicle 100 (step S2). In a case where it is determined that there is no charging request from the vehicle 100 (No at step S2), the management system finishes a series of control. On the other hand, in a case where it is determined that there is the charging request from the vehicle 100 (Yes at step S2), the management system confirms a charging specification of the vehicle 100 (step S3).

Next, the management system schedules the charging (step S4). First, the management system determines whether the charger 30 is available (step S5). When there is no available charger 30 (No at step S5), the management system makes a charging reservation for using the charger 30 when the charger 30 becomes available (step S6) and returns to the process at step S5.

When the management system determines at step S5 that the charger 30 is available (Yes at step S5), the management system determines whether the robot arm 22 of the charging robot 20 is available (step S7). When it is determined that the robot arm 22 is not available (No at step S7), the management system repeatedly executes the process at step S7 until the robot arm 22 becomes available.

When the management system determines at step S7 that the robot arm 22 is available (Yes at step S7), the management system instructs and allows the charging robot 20 to confirm the position of the charger 30 used for charging (step S8). Next, the charging robot 20 confirms the position of the vehicle 100 and the position of the charging port of the vehicle 100 on the basis of information regarding the vehicle 100 from the management system (step S9). Next, the vehicle 100 receives the instructions from the management system, unlocks the charging port, and makes a charging lid freely openable/closable (step S10). Next, the charging robot 20 receives the instructions from the management system, and opens the charging lid by the robot hand 23 provided at a tip end of the robot arm 22 (step S11). Next, the charging robot 20 moves the robot arm 22 toward the charger 30 and holds the charging plug 33 of the charger 30 by the robot hand 23 (step S12). Then, the charging robot 20 moves the robot arm 22 toward the vehicle 100 and inserts the charging plug 33 into the charging port of the vehicle 100 by the robot hand 23 (step S13). Thereafter, the charging robot 20 releases the charging plug 33 to return the robot arm 22 to the arm reference position being a standby position set in advance (step S14).

Also, when the charger 30 confirms that the charging plug 33 is inserted into the charging port of the vehicle 100, this supplies power to the vehicle 100 via the charging plug 33 and starts charging the vehicle 100 (step S15). When the charging of the vehicle 100 is started in this manner, the management system finishes a series of control at the time of vehicle entrance.

Note that, when confirming the position of the charging port of the vehicle 100 at step S9, in a case where the charging port is located in a position where the charging plug 33 of the charger 30 to be used cannot be inserted, it is possible to notify and urge the driver of the vehicle 100 to correct the position and orientation of the vehicle 100.

FIG. 9 is a flowchart illustrating an example of automatic charging control when the vehicle 100 leaves the parking facility.

First, the management system provided in the parking facility determines whether there is a request for leaving of the vehicle 100 (step S21). When it is determined that there is no request for leaving of the vehicle (No at step S21), the management system determines whether the charging of the vehicle 100 is completed (step S22). In a case where it is determined that the charging of the vehicle 100 is not completed (No at step S22), the management system returns to the process at step S21.

When the management system determines that there is the request for leaving of the vehicle at step S21 (Yes at step S21), or when the management system determines that the charging of the vehicle 100 is completed at step S22 (Yes at step S22), the management system determines whether the robot arm 22 of the charging robot 20 is available (step S23). When it is determined that there is no available robot arm 22 (No at step S23), the management system interrupts priority of order of use of the robot arm 22 so that the robot arm 22 can be used for the vehicle 100 (step S24).

When the management system determines that the robot arm 22 is available at step S23 (Yes at step S23), or when the management system interrupts the priority of the robot arm 22 at step S24, the management system instructs the charging robot 20 to confirm the position of the charger 30 charging the vehicle 100 (step S25). Next, the charging robot 20 confirms the position of the vehicle 100 and the position of the charging port of the vehicle 100 on the basis of the information regarding the vehicle 100 from the management system (step S26). Next, the charging robot 20 moves the robot arm 22 toward the vehicle 100 and holds the charging plug 33 inserted into the charging port of the vehicle 100 by the robot hand 23 (step S27). Then, the charging robot 20 removes the charging plug 33 from the charging port of the vehicle 100 (step S28). Next, the charging robot 20 moves the robot arm 22 toward the charger 30 and returns the charging plug 33 to the plug reference position set in advance in the charger 30 (step S29).

Next, the charging robot 20 moves the robot arm 22 toward the vehicle 100 and closes the charging lid of the vehicle 100 (step S30). Next, the vehicle 100 locks the charging port such that the charging lid cannot be opened/closed (step S31). Also, after returning the charging plug 33 to the plug reference position, the charging robot 20 releases the charging plug 33 to return the robot arm 22 to the arm reference position being a standby position set in advance (step S32). When the robot arm 22 is returned to the arm reference position in this manner, the management system finishes a series of control at the time of vehicle leaving.

Note that, the charging system according to the present disclosure is, for example, also applicable to a parking facility in which a plurality of parking spaces is provided in the front-to-rear direction of the vehicle in which a plurality of vehicles can be parallelly parked, and a parking facility in which a plurality of parking spaces inclined with respect to a road on which the vehicle travels is provided so as to be parallel to the road. Furthermore, the charging system according to the present disclosure is also applicable to a parking facility provided with a plurality of parking spaces provided in a conveyance such as a vehicle carrier or a ship.

Since the charging system according to the present disclosure can automatically charge a plurality of vehicles by the arm mechanisms, the number of which is less than that of the charging cables, there is an effect that a lower cost can be achieved than in a case where the number of arm mechanisms is the same as that of the charging cables.

According to an embodiment, it is possible to realize a lower cost than in a case where the charging cables are provided corresponding to the respective charging spaces.

According to an embodiment, it is possible to charge a large number of vehicles while suppressing the cost of the charging system.

According to an embodiment, before the charging of the vehicle, into which the charging plug is inserted, is completed, it is possible to remove the charging plug and insert the charging plug to the charging port of another vehicle.

According to an embodiment, due to the movement of the moving body, it is possible for the arm mechanism to insert and remove the charging plug to and from the charging port of the vehicle over a wider range.

According to an embodiment, the charging plug can be removed from and inserted into the charging port of the vehicle easily.

According to an embodiment, it is possible to provide the arm mechanism even in a charging space which is narrow in top view.

According to an embodiment, it is possible to notify the user of the vehicle to be charged that the automatic charging cannot be currently performed.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A charging system comprising:
a plurality of charging devices, each including a device main body having one or more charging cables connected to the device main body, the charging cables being equipped with respective charging plugs; and
one or more arm mechanisms each being configured to grasp any one of the charging plugs of the plurality of charging devices and to automatically and respectively insert and remove the grasped charging plug to and from a charging port of a first vehicle located in a charging space,
wherein a number of the one or more arm mechanisms is smaller than a number of the one or more charging cables, and
the charging system is configured to perform charging on the first vehicle located in the charging space on a same side where one of the charging cables of a respective one of the plurality of charging devices is connected to the device main body of the respective one of the charging devices, the respective one of the charging devices charging the first vehicle located in the charging space.

2. The charging system according to claim 1, wherein the number of the one or more charging cables is smaller than a number of charging spaces.

3. The charging system according to claim 1, wherein each of the one or more arm mechanisms is configured to automatically remove the charging plug of the one of the charging cables of the respective one of the charging devices charging the first vehicle located in the charging space from the charging port of the first vehicle located in the charging space when charging of the first vehicle is completed, and to grasp any one of the charging plugs of the plurality of charging devices to insert the grasped any one of the charging plugs into a charging port of another vehicle located in another charging space.

4. The charging system according to claim 1, wherein the one or more arm mechanisms is configured to release and return the respective charging plugs of the charging cables to a predetermined position after insertion thereof into the charging port of the first vehicle.

5. The charging system according to claim 1, further comprising:
a movable moving body on which an arm mechanism of the one or more arm mechanisms is mounted.

6. The charging system according to claim 1, wherein the one or more arm mechanisms are respectively hung on a supporting member.

7. The charging system according to claim 1, wherein, when one of the respective charging plugs does not reach a charging port of a vehicle, a user of said vehicle is notified of the fact that the charging plug does not reach the charging port.

* * * * *